No. 667,095. Patented Jan. 29, 1901.
H. LANE.
ELECTRICAL TRACTION ON CLOSED CONDUIT SYSTEMS.
(Application filed Aug. 18, 1900.)
(No Model.)
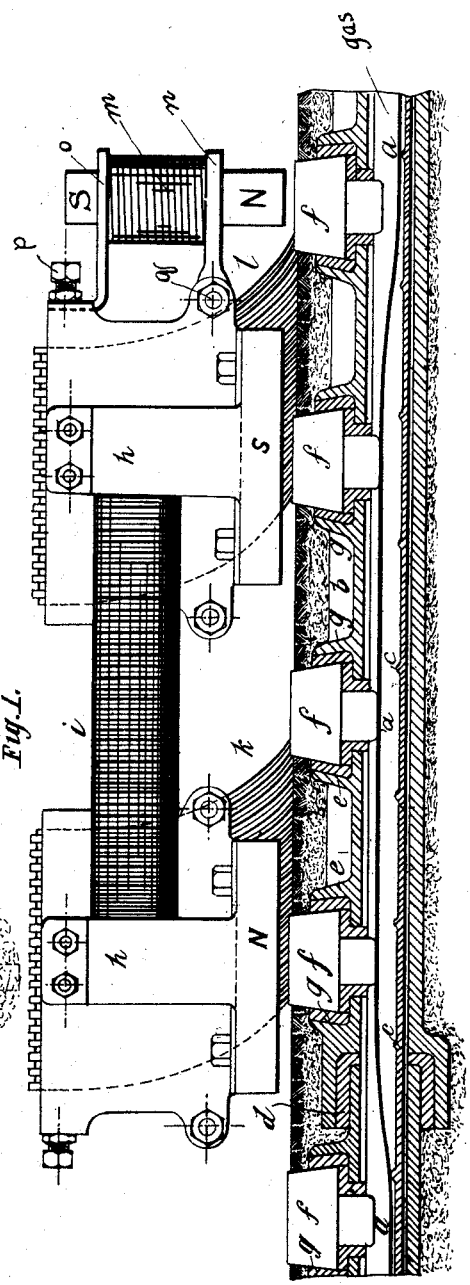

UNITED STATES PATENT OFFICE.

HOWARD LANE, OF BIRMINGHAM, ENGLAND.

ELECTRICAL TRACTION ON CLOSED-CONDUIT SYSTEMS.

SPECIFICATION forming part of Letters Patent No. 667,095, dated January 29, 1901.

Application filed August 18, 1900. Serial No. 27,325. (No model.)

*To all whom it may concern:*

Be it known that I, HOWARD LANE, a subject of the Queen of Great Britain, residing at 6 Corporation street, Birmingham, in the county of Warwick, England, have invented a certain new and useful Improvement in Electrical Traction on Closed-Conduit Systems, of which the following is a specification.

My invention relates more especially to the systems of electrical traction known as "conduit surface-contact" or "underground" types, and it is particularly applicable to the case of electric tramways and "light" railways. This system is distinguished by the fact that the tube or conduit in which a main electric conductor is placed is arranged at a short distance below the surface of the road and is completely closed, the communication with the electric motor upon the car (by which the latter is propelled) being effected not through a continuous slot or opening along the upper side of the tube or conduit, as in some other systems, but by means of a series of exterior surface magnetic pieces insulated from each other, over which the poles of an electromagnet carried by the car pass and serve to magnetize the surface magnetic pieces or rails in succession as it passes over them, their lower sides when so magnetized attracting and raising into contact with them the flexible electrical conductor in the conduit, the electricity from which accordingly passes to the surface magnetic pieces, from which it is collected and led to the electromotor on the car, the return-current being through the main rails or through a conductor similar to that described to the electrical-supply station. Apparatus, however, constructed and used according to this system of electrical traction has been found open to serious objections and has not heretofore come into practical use, the electrical conductor or conductors or cable or cables and the arrangement and means for laying it or them and the devices for bringing it into active connection with electromotor apparatus arranged upon the car or carriages being expensive, difficult to properly lay and arrange in the first instance, and liable to get out of order, while not always working perfectly satisfactorily and frequently failing when in operation, the contact-surfaces of the conductor or conductors and of the surface magnetic pieces or rails contained in the conduit being very liable to oxidation and corrosion by the passage of the electricity between them, so that the passage of the electric current to the motor is no longer assured. By my present invention these difficulties and objections are overcome and the entire apparatus rendered very simple, economical, durable, and effective, a good and active working of the conductor or conductors and other devices being at all times assured, accompanied by facility for installation without disturbances of old lines, non-interference with gas and water mains, and ready passage over existing bridges.

The system constructed according to my invention consists, essentially, of a distributing electric conductor or cable sufficiently flexible vertically placed within a closed airtight conduit or pipe disposed in the ground between or adjoining the rails of a track. This conductor or cable in the case where a metallic conduit is used rests normally upon earthenware or other insulating blocks or supports, preferably of a shallow trough-like section arranged in the conduit along its bottom and sides, and the conductor is of such construction and formation as to be capable of flexing or bending up sufficiently into a curve at any part of its length when such part is lifted up from the seating formed by the insulating blocks or supports. The flexible conductor or cable is preferably in the form of a thin strip in cross-section and is of soft iron or such other material as may be capable of magnetization and of forming at the same time a good carrier or conductor for electrical current. The conductor may be coated with a metallic material in order to prevent its oxidation and to insure efficient conduction and good electrical contact with the surface magnetic pieces or pole-pieces hereinafter described. The flexible conductor or cable is laid within the conduit sufficiently freely to enable parts of it to be lifted somewhat, as before described. It may, if necessary, be provided with folds or loops or equivalent devices, so that it may be capable of sufficient expansion or contraction without interfering with its function or preventing it from bending up sufficiently. The conduit in which the conductor is laid is an air-tight trough or pipe, preferably of more or less rectangular section, running the full length of the track. It is hermetically sealed or closed and is formed in sections or lengths which are jointed together on the spigot-and-socket principle, the joint being of insulating material. The conduit is made of a non-magnetic alloy or material, so that the field of a magnet moving over it is not materially weakened, and it is carefully laid in the ground, its upper surface being just below the road-level, and is preferably surrounded with asphalt or other insulating material which prevents liability to earth connection.

The upper longitudinal surface of the conduit pipe or trough described is provided at regular distances apart and at frequent intervals for its full length with dovetail or other shaped sockets or recesses, into each of which is fitted a soft-iron "pole-piece" or electrical junction-piece or conductor of such length that its lower end or face projects down into the conduit to within a certain short distance of the flexible conductor, while its upper end or face (which is only of short length) projects upward level with or slightly above the road-surface. The pole-piece is provided with a shoulder which rests upon an electrically-insulating washer at the bottom of the socket, and it is firmly secured in the latter with electrically-insulating cement, so that it is entirely insulated from the conduit. The flexible conductor is supplied with electrical current at intervals through flexible or other connections from the distributing electrical mains or feeders.

In order to collect electricity from the flexible conductor described and supply it to the motor on the car or carriage, the latter carries underneath its body one or more magnets and collecting-brushes or skate-runners. The magnet may be permanent, but is preferably an electromagnet (which may be initially excited by a small galvanic battery, but when once excited is sustained by a shunt off the main current.) When the car is traveling, as the magnet passes above the upper ends of the pole-pieces it excites or magnetizes them sufficiently to cause them to attract the charged flexible main conductor in the conduit and draw or bend it up from the insulated blocks or supports which form its seating sufficiently for it to make electrical contact with the inner or lower ends of the pole-pieces.

The poles proper of the magnet or magnets themselves may be constructed in the form of metallic brushes, which as the car travels slide or sweep over the upper surface of the several pole-pieces in succession, or an independent collector having a brush contact may be used to pass over the said surface of the pole-pieces, or a skate-runner may be arranged for the same purpose, having a rubbing effect.

The electromagnet presents two poles to the pole-pieces upon the upper side of the conduit, and the face of each pole of the magnet covers or passes above at least two of the pole-pieces at once, and these and the two poles of the magnet may be sufficiently far apart for one or more vertical pole-pieces to be situated in the space between them.

The accompanying drawings are illustrations of my invention.

Figure 1 is a longitudinal section through one of the pipes or conduits. Fig. 2 is a transverse section through the conduit, and Fig. 3 is a transverse section through the electromagnet carried by the car or carriage.

The same letters of reference indicate similar parts in the several figures.

$a$ is the distributing conductor or cable, $b$ is the closed air-tight conduit or pipe, and $c\,c$ are the insulating blocks or supports upon which the conductor rests.

D is one of the joints between two sections of the pipe or conduit $b$, and $e\,e\,e$ are the dovetail-shaped sockets or recesses into which the pole-pieces $f\,f\,f$ are fitted, but are kept insulated by insulating cement or material $g$.

The electromagnet $h$, carried by the car or carriage, is shown having two cores wound with insulated wire at $i$, as shown in Fig. 3, but any convenient form may be used. Their poles N S are divided so that the collecting-brushes $k\,l$ can be arranged between them and brush over the upper surface of the pole-pieces $f$, the poles N S passing sufficiently near to the pole-pieces to induce in them the magnetism necessary to raise the flexible conductor $a$ into contact with their lower ends, electricity from the conductor then passing through the pole-pieces and the brushes to the electromotor on the car.

An important feature in my present invention consists in the use, in the closed conduit or pipe containing the conductor in systems of electrical traction known as "conduit surface-contact" or "underground" types, of a gas low in oxygen or a gas which not only contains no free oxygen, but has chemical affinity for oxygen—such, for example, as coal-gas, carbonic oxid, or hydrogen—which will have the effect of reducing metallic oxids to their normal metallic condition. The presence of such a gas or reducing agent prevents oxidation and corrosion of the respective contact-surfaces of the conductor or conductors and of the pole-pieces or electrical junction-pieces or conductors with which they come in contact and through which electricity from the conductor passes, so that a perfect and active electric contact and working between these parts is at all times insured.

It will be obvious that by the use of a second conduit such as that described the tramrails themselves need not be used for the return-current. They need not, therefore, be bonded or disturbed, and existing roads can be converted to my improved system without stoppage of traffic or interference with rails.

The operation of the system is as follows: The car being placed upon the line and the conductor charged, the electromagnet is initially excited and the flexible conductor at once rises from its insulated supports and makes electrical contact with the lower end of the pole-pieces, from the upper surface of which the brushes or collectors draw the current. The magnet being wound with fine wire and provided with suitable resistance only sufficient current flows around it to maintain it in an excited condition. The motor on the car is set in motion, regulated, and controlled in the well-known way by the driver.

The arrangement of pole-pieces and magnets described insures the destruction of all residual magnetism (if there should be any) in the pole-pieces in the trail of the magnet, each receding pole-piece being instantly demagnetized by the induction of its preceding and more powerfully-magnetized neighbor. All tendency of the flexible conductor to adhere to the pole-pieces after the car has passed is therefore removed. For additional security, however, I sometimes provide upon the car or carriage means for dealing with any such residual magnetism in the pole-pieces after the magnet or magnets on the car have passed over and left them. To effect this, I preferably provide upon the car at the rear of the magnets proper a secondary magnet, either electro or permanent, presenting to the pole-pieces one only of its poles. The secondary magnet may be attached to the main magnet, as illustrated in Fig. 1. The magnet $m$ is provided at its upper end with the extension $o$, which is secured to the frame of the main magnet by the bolt $p$. At the lower end of this magnet $m$ is provided the portion $n$, which is secured by the bolt $q$. The pole of this secondary magnet so presented is of the opposite sign to, but considerably weaker than, the rear or trailing pole of the main electromagnet, so that it is of the like sign to the upper ends of the pole-pieces as it passes over them. This has the effect of either neutralizing the residual magnetism in the pole-pieces or of so changing it that the said pole-pieces will repel the flexible conductor or cable from their lower ends. If an electromagnet be used for this secondary magnet, it is kept constantly excited.

It will be seen that by the novel details of construction and arrangement described the only parts exposed on the surface of the road are the small rectangular faces of the upper ends of the pole-pieces, which are at regular distances apart and absolutely free from electricity except at the time when the magnet upon the car is passing over them. There is therefore no danger in the use of my improved system, the separate pole-pieces being absolutely dead and neutral as soon as the car has passed without any possibility of electricity being then communicated from them by accidental or other contact with their small upper surface, which constitutes the only part of the entire system which is exposed or visible at or above the surface of the roadway.

I do not confine myself to the precise form and proportion of the parts of apparatus made under my improved system nor to the precise method of construction and arrangement, which may be varied more or less to suit varying circumstances, nor do I claim the use of a flexible conductor or the use of electromagnets on the car influencing the flexible conductor as they pass along it; but, Having now particularly described and ascertained the nature of my said invention and in what manner the same is to be performed, I declare that what I claim is—

1. In an electric railway, the combination with a closed conduit, a conductor of magnetic material running through said conduit, and insulated soft-iron pole-pieces located at intervals in said conduit; of a traveling magnet adapted to pass over and magnetize said pole-pieces, the pole-pieces of said magnet being capable of covering two of said pole-pieces in the conduit, a secondary magnet of opposite polarity and less strength than the adjacent pole-piece of the traveling magnet, also adapted to pass over said conduit pole-pieces after the pole-pieces of said traveling magnet have passed thereover, and means for conducting the current from the pole-pieces of said conduit, substantially as described.

2. In an electric railway, the combination with a closed conduit, said conduit being made up of sections joined together, soft-iron pole-pieces mounted in and insulated from said conduit, and a conductor passing through said conduit, said conductor being adapted to be attracted by said pole-pieces; of a traveling magnet adapted to pass over and magnetize said pole-pieces successively, a secondary magnet of opposite polarity and less strength than the adjacent pole-piece of the traveling magnet, also adapted to pass over said conduit pole-pieces after the pole-pieces of said traveling magnet have passed thereover, and brushes carried by said magnet for conducting the current from said conduit pole-pieces, substantially as described.

3. In an electric railway, the combination with a closed conduit, a conductor within said conduit of magnetic material, and means adapted to attract said conductor and make electrical contact therewith; of a gas low in or free from oxygen filling the space within said conduit, whereby oxidation or corrosion of the contact-surfaces is prevented, substantially as described.

4. In an electric railway, the combination with a closed conduit, a conductor within said conduit composed of magnetic material, and pole-pieces carried by said conduit, which when magnetized attract and make electrical contact with said conductor; of a gas having a chemical affinity for oxygen filling the space within said conduit whereby oxidation or corrosion of the contact-surfaces is prevented, substantially as described.

In witness whereof I have hereunto set my hand in presence of two witnesses.

HOWARD LANE.

Witnesses:
ARTHUR E. EDWARDS,
H. HOWARD.